No. 838,693. PATENTED DEC. 18, 1906.
J. DEGENHARDT.
U-BAR FOR GLASS ROOFS AND GLASS WALLS.
APPLICATION FILED JAN. 12, 1906.

Witnesses

Inventor
Johannes Degenhardt
By Wright, Brown, Quinby & May
Attorneys

UNITED STATES PATENT OFFICE.

JOHANNES DEGENHARDT, OF BERLIN, GERMANY, ASSIGNOR TO WILLIAM F. PLASS, OF NEW YORK, N. Y.

U-BAR FOR GLASS ROOFS AND GLASS WALLS.

No. 838,693.     Specification of Letters Patent.     Patented Dec. 18, 1906.

Application filed January 12, 1906. Serial No. 295,791.

*To all whom it may concern:*

Be it known that I, JOHANNES DEGENHARDT, a subject of the German Emperor, and a resident of 33 Waldstrasse, Berlin, Germany, have invented new and useful Improvements in Skylights and Sidelights, of which the following is a specification.

The invention relates to improvements in U-bars for glass roofs and glass walls, the said U-bars serving to support the panes of glass used as well as for carrying away any water collecting on the latter. In these U-bars are fixed bridge-like brackets, on which the panes of glass are fastened by means of lengthwise plates, bars, or caps of metal or other appropriate substance and screw or bolt and nut.

The invention consists therein that the upper lengthwise sides of the U-bar, which may be conveniently made of sheet metal, is bent inward like a spiral, and in the yoke thus formed is carried a bridge-like bracket with hook-like ends which fit into the said yoke formed by the inward bending of the upper sides of the U-bar. By this means a double strengthening of the U-bar is attained—namely, by the spiral form of the upper part of the sides of the U-bar and by the bridge-like bracket with its hook-like ends fitting into this in such a manner that it holds the two sides of the U-bar together, and thus prevents the sides from being bent outward. By reason of this strengthening and stiffening of the U-bar it can be made of considerably lighter and thinner metal or other material than has heretofore been necessary. Furthermore, the position of the bridge-like brackets is fixed and held by this arrangement without any other means of fastening them in place.

The accompanying drawings show side and cross-section views of one form of this invention.

Figure 1:
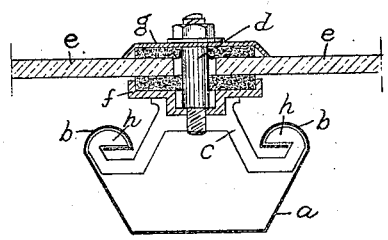
Figure 2:
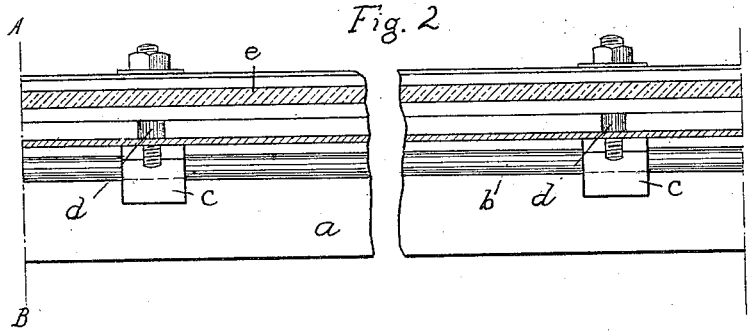
Figure 3:
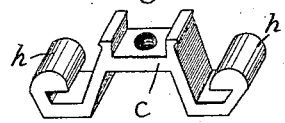

Figure 1 is a vertical section on line A B of Fig. 2, which is a side view of a complete U-bar; and Fig. 3 is a perspective view of a bridge-like bracket with hook-like ends.

The U-bar $a$, which may have any desired cross-section form, is bent inward at the upper end of the sides in such manner that the half-spiral form $b$ results lengthwise on the U-bar. These half-spirals are bent around so as to not quite touch the sides of the U-bar, and are therefore open from below, as shown in Fig. 1. The bridge-like brackets $c$, which carry the fastening-screws $d$, the panes of glass $e$, and the holding-bars $f$ and $g$, are provided with hook-like ends $h$, Fig. 3, so made as to fit the half-spiral yoke $b$, so that, as an illustration, by sliding the bracket $c$ into one end of the U-bar $a$ the hook-like ends $h$ hook and fit into the half-spiral yoke $b$, as may be seen in Fig. 1. By this hook-like fitting and holding together of the yoke $b$ and the hook-like ends $h$ the support and the connection between the U-bar $a$ and the bracket $c$ is obtained.

The form of the U-bar, as also the placing of the panes of glass and the fastening of the same to the U-bar, can be altered to suit the conditions in the various forms of buildings and other constructions where they may be employed.

Having fully described my invention, what I claim, and desire to secure by Letters Patent, is—

1. Improved U-bars $a$ for glass roofs and glass walls, whose sides are bent spirally $b$, and bridge-like brackets $c$, with hook-like ends $h$, which fit and hook into the spiral yoke $b$.

2. A skylight structure comprising a supporting channel-bar having its edges bent spirally inward, brackets having hook-shaped ends engaged with the said bent edges of the bar and supported thereby above the bottom of the bar, and means for connecting glass panes with said brackets.

3. A skylight structure comprising a supporting channel-bar having its edges bent spirally inward, brackets having hook-shaped ends fitting within the bent edges of the bar, clamp-plates for engaging panes of glass, and screws or bolts passing through said clamp-plates and brackets.

In testimony whereof I have affixed my signature in presence of two witnesses.

JOHANNES DEGENHARDT.

Witnesses:
   HENRY HASPER,
   WOLDEMAR HAUPT.